United States Patent [19]
Kaplan

[11] Patent Number: 5,867,215
[45] Date of Patent: Feb. 2, 1999

[54] IMAGE SENSOR HAVING MULTIPLE STORAGE WELLS PER PIXEL

[75] Inventor: Martin C. Kaplan, Rochester, N.Y.

[73] Assignee: Eastman Kodak Company, Rochester, N.Y.

[21] Appl. No.: 825,261

[22] Filed: Mar. 27, 1997

Related U.S. Application Data

[63] Continuation of Ser. No. 419,881, Apr. 11, 1995, abandoned.

[51] Int. Cl.[6] .................................................. H04N 5/335
[52] U.S. Cl. .......................... 348/315; 348/310; 348/316; 348/321; 348/323; 257/220; 257/232
[58] Field of Search .................................... 257/220, 221, 257/229, 232, 233, 236, 243; 348/294, 311, 312, 313, 314, 315, 316, 317, 324; H04N 5/335

[56] References Cited

U.S. PATENT DOCUMENTS

| 4,873,561 | 10/1989 | Wen | 357/24 |
|---|---|---|---|
| 4,967,249 | 10/1990 | Suni | 257/220 |
| 5,055,677 | 10/1991 | Amirav et al. | 250/282 |
| 5,055,930 | 10/1991 | Nagasaki et al. | 358/213.11 |
| 5,055,931 | 10/1991 | Cazaux et al. | 358/213.11 |
| 5,206,530 | 4/1993 | Kawamoto et al. | 257/231 |
| 5,221,848 | 6/1993 | Milch | 250/559 |
| 5,268,567 | 12/1993 | Bowlby, Jr. et al. | 250/280.1 |
| 5,283,426 | 2/1994 | Bowlby, Jr. et al. | 250/208.1 |
| 5,289,022 | 2/1994 | Iizuka et al. | 257/232 |
| 5,349,215 | 9/1994 | Aragnostopoulos et al. | 257/223 |
| 5,355,165 | 10/1994 | Kosonocky et al. | 348/311 |
| 5,369,293 | 11/1994 | Slob | 257/241 |
| 5,486,858 | 1/1996 | Knupfer | 348/303 |
| 5,497,195 | 3/1996 | Sayag | 348/266 |

OTHER PUBLICATIONS

"CMOS Active Pixel Image Sensor" by Mendis, et al, IEEE Transactions on Electron Devices, vol. 41, No. 3, Mar. 1994.

Primary Examiner—Andrew I. Faile
Assistant Examiner—Ngoc-Yen Vu
Attorney, Agent, or Firm—James D. Leimbach

[57] ABSTRACT

An image sensing device having an array of photodetectors capable of generating electron/hole pairs from incident photons, with multiple charge coupled devices organized in a tandem well design that employs multiple storage wells per pixel. The wells use thresholds to control the overflow of charge from one well to the next and are arranged such that a first charge coupled device having a plurality of cells is operatively coupled to the photodetectors by first transfer means for placing charge accumulated within the photodetectors from generated electron/hole pairs within the first charge coupled device, and a second charge coupled device having a plurality of cells being operatively coupled to the first charge coupled device by second transfer means for removing charge exceeding a predetermined threshold within the first charge coupled device and placing charge exceeding the predetermined threshold within the second charge coupled device. Clocking means are provided for cycling charge through the cells of the charge coupled devices. Embodiments have output means for combining signals from first and second charge coupled devices, and generating either analog or digital outputs. These techniques can also be employed with an active pixel architecture.

21 Claims, 5 Drawing Sheets

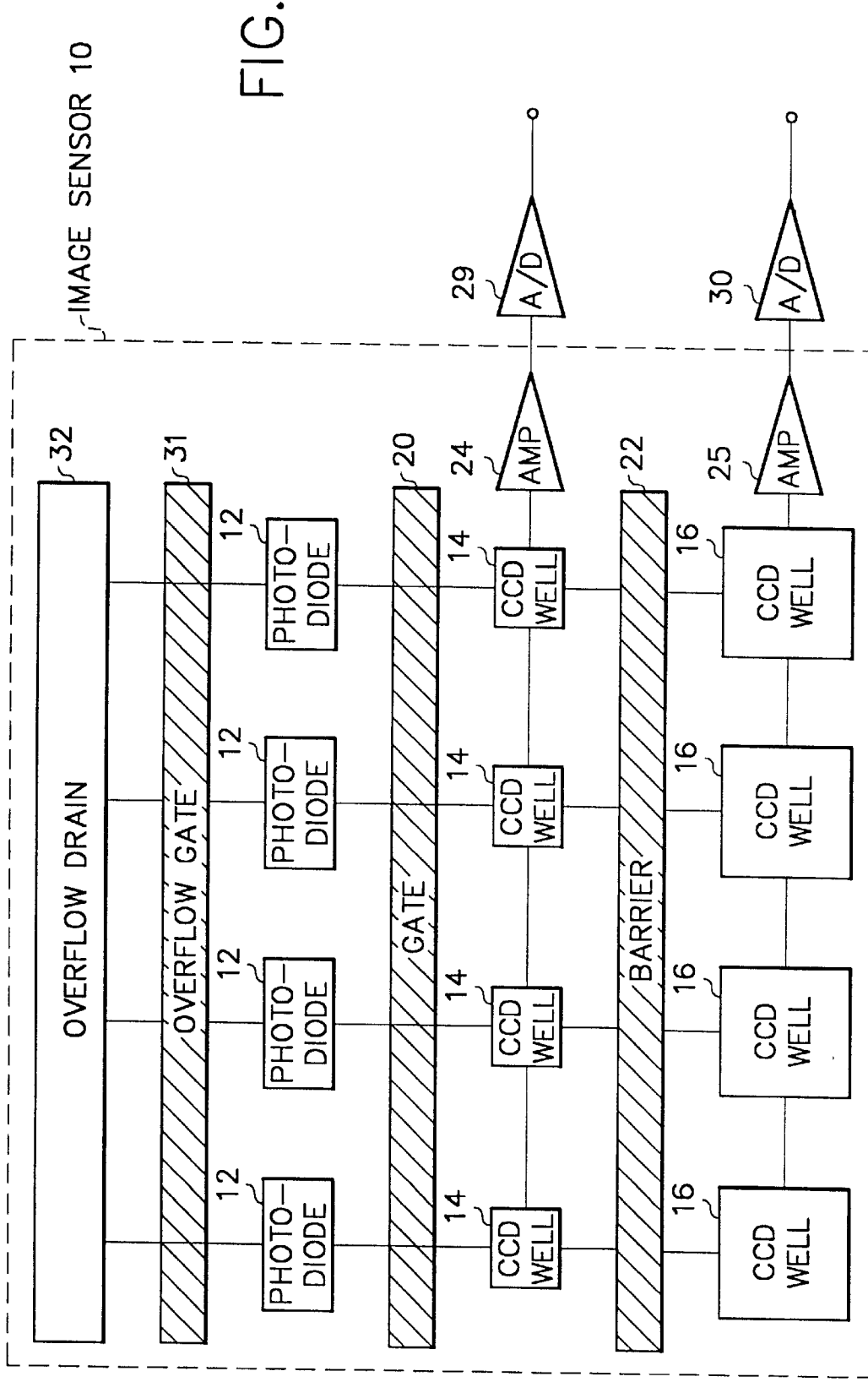

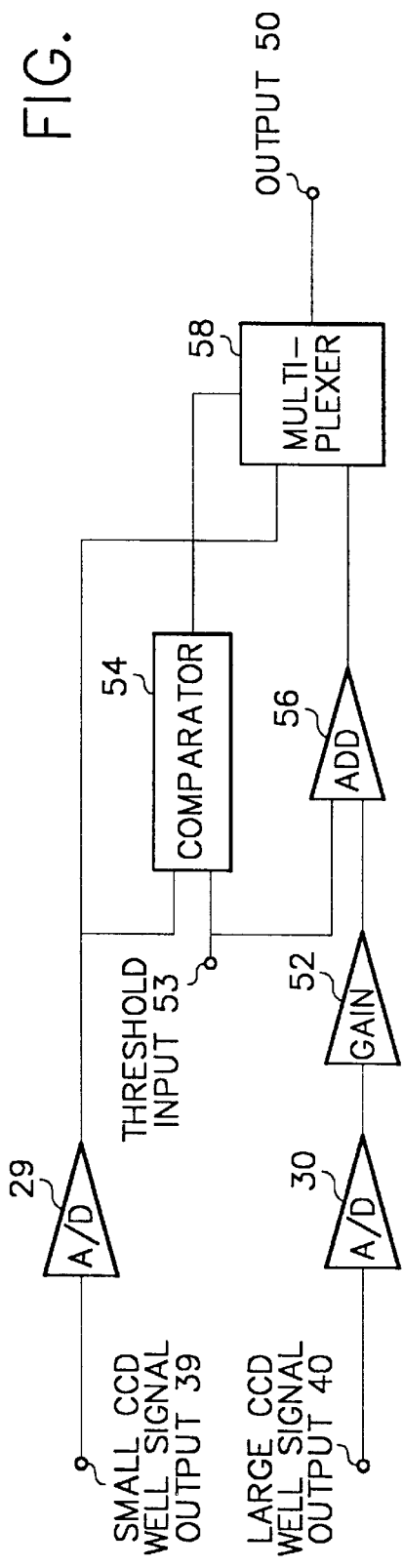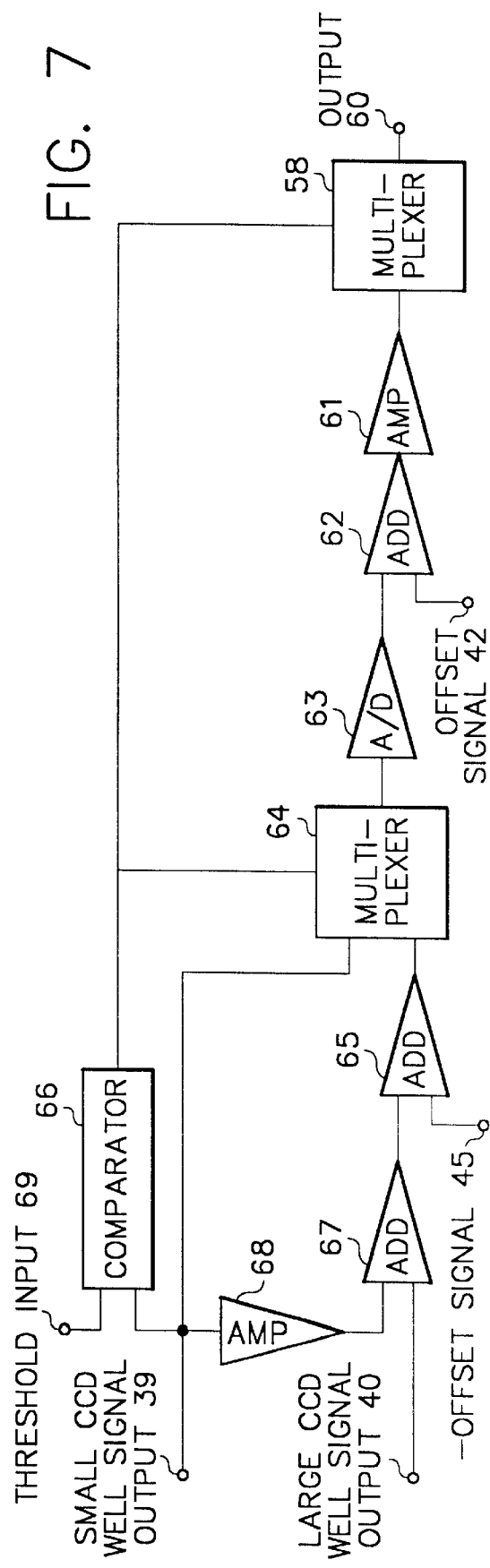

IMAGE SENSOR HAVING MULTIPLE STORAGE WELLS PER PIXEL

This is a continuation of application Ser. No. 08/419,881, filed 11 Apr. 1995, now abandoned.

BACKGROUND OF THE INVENTION

1. Field of Invention

The present invention pertains to charge coupled devices (CCDs), and more particularly, to CCDs that have multiple well designs per pixel to increase charge storage capacity.

2. Background of the Invention

CCD imagers are used in a variety of applications, including film digitizers, video cameras, electronic still cameras, FLIR (forward looking infra-red, mostly for military applications), and medical radiography systems. The dynamic range of existing CCD imagers is limited, and inadequate for some applications.

Digitizing radiographic film is a particularly demanding application. The ratio of largest to smallest signal is typically about 3000, corresponding to a film density range of about 3.5 (log 3000≈3.5). A typical requirement for signal-to-noise ratio is 15:1, resulting in a dynamic range requirement of about 15 times 3000, approximately 50,000. Some applications require even greater dynamic range. Such a dynamic range is not available with existing CCD imagers.

CCD imagers convert photons (light) to electrons (or holes), and accumulate the electrons in wells. The maximum signal in such a system is limited by the number of electrons that the wells can hold before overflowing. The capacity of the wells can be increased, but generally this also increases the electronic noise. Thus, the dynamic range is limited, typically far below 50,000.

U.S. Pat. No. 5,221,848 discusses constructing two CCD sensor arrays, one for weak signals and one for strong signals, to increase the dynamic range. U.S. Pat. Nos. 5,268,567; 5,283,426; 5,055,667; and 4,873,561 discuss modifying the CCD sensor and/or control electronics to produce a non-linear response, which increases the largest usable signal, thereby increasing the dynamic range.

In U.S. Pat. No. 5,221,848, issued to Milch (hereinafter referred to as Milch), Milch provides wide dynamic range by providing separate sensors for low and high signals. With this approach, the low signal sensor may see a different image than the high signal sensor, because they are at different locations, may be exposed at different times or for different exposure periods, and may be exposed through different filters. Another problem with the teachings of the disclosure of Milch is that it discards some of the available signal, e.g. by reducing the exposure time or applying a neutral density filter to the light. By discarding signal, this worsens the signal/noise ratio.

U.S. Pat. Nos. 5,268,567; 5,283,426; 5,055,667; and 4,873,561 all discard signal, by various means, and thus worsen the signal/noise ratio, as compared with the tandem CCD design. The tandem CCD design also has lower noise (and thus better signal/noise ratio) than U.S. Pat. No. 4,873,561, because the tandem design separates the small and large wells by a barrier, so that dark current noise generated in the large wells does not leak into the small wells; while in the U.S. Pat. No. 4,873,561 design dark current noise generated in the large wells flows easily into the small wells, thereby corrupting even the small signals with large amounts of noise.

A typical prior art, linear CCD imager is shown in FIG. 1. The photodiodes convert incident photons to electrons during the exposure time interval. After the exposure, the Gate is lowered, allowing the electrons to move into the adjacent CCD wells. Then the chain of CCD wells is clocked, bucket brigade style, moving the charge in each CCD well to the next CCD well. The end CCD well is clocked into an amplifier, then into an analog to digital converter, producing a digital signal. Each pixel position comprises a photodiode and a CCD well. The dashed line encloses the portion that is typically on a single integrated circuit. This example shows a 4 pixel CCD imager. Typical linear CCD imagers contain hundreds or thousands of pixels.

During exposure to light, the photons generate electron/hole pairs in the photodiode. In most devices the electrons are used, and the holes are discarded. After the exposure is complete, the gate is lowered, allowing the electrons to flow from the photodiode into the CCD well. If the light signal is too strong, the capacity of the CCD well is exceeded, i.e. there are more electrons than the well can hold. In some devices, to prevent the excess electrons from flowing to adjacent pixels (a phenomenon called blooming), an overflow gate and overflow drain are provided. Properly adjusting the voltage on the overflow gate limits the number of electrons which can accumulate in the photodiode. The excess electrons flow over the overflow gate, into the overflow drain, where they are removed. FIG. 2 shows the energy diagram for a single pixel.

Referring to FIG. 2, which is an energy diagram of one pixel of the typical prior art CCD imager shown in FIG. 1, the photons create electrons in the photodiode. The gate is then lowered, and the electrons drain into the CCD well. The height of the overflow gate can be set to limit the total number of electrons that accumulate in the photodiode, by allowing excess electrons to pass to the overflow drain. The overflow gate and overflow drain also are sometimes used to provide electronic shutter control. In such cases, the overflow gate is fully lowered for a period of time, then raised. Electrons accumulate in the photodiode only while the overflow gate is raised. Thus, extending the period when the gate is lowered decreases the time interval when electrons accumulate, thereby decreasing the exposure.

After the CCD wells receive charge from the photodiodes, the row of CCD wells are clocked out to the amplifier, bucket brigade style. The charge in each CCD well is passed to the adjacent CCD well. The charge from the end CCD well is passed to the amplifier. This charge is amplified and passed to an analog-to-digital converter (A/D), where the analog signal is converted to a digital number. This clocking is repeated until every CCD well, one at a time, is passed to the amplifier and A/D, resulting in a series of digital numbers, one number corresponding to the light signal collected at each of the photodiodes.

In most designs, the maximum signal that can be sensed is governed by the electron capacity of the CCD wells. Typical devices have CCD well capacities of between 50,000 and 1,000,000 electrons. The CCD well capacity can be increased, but there is a corresponding increase in electronic noise, so that the signal to noise ratio is limited.

SUMMARY OF THE INVENTION

The present invention describes a modified CCD imager design in which more than one CCD well is present for each pixel. The CCD wells are of different electron capacities. For each pixel, there is a single photon to electron converter (such as a photodiode), which feeds electrons (or holes) to the smallest capacity CCD well. When this well fills to near capacity, it overflows a barrier into an adjacent, larger capacity well. Similarly, this well overflows into an even larger capacity well, and so on. The smallest wells are interconnected to provide a cascaded output chain, as is typical of a CCD device, where each well is clocked into the next well of the chain, and the end of the chain is clocked into an amplifier. Similarly, the wells of the next larger size are interconnected to provide a cascaded output chain. And similarly for each larger group of well sizes.

The small well CCD chain provides a low noise signal for the pixels which receive a small number of photons (small signals). The next larger size CCD chain provides a somewhat noisier signal for somewhat larger photon signals. The largest size CCD chain provides the signal for the highest photon signals. An optional overflow drain provides anti-blooming protection against even larger signals.

The multiple CCD well sizes produce multiple outputs from the CCD chains for each pixel. Means are described for combining the multiple signals to produce a single, wide dynamic range signal for each pixel.

The CCD imager is combined with illumination, optics and mechanical transport to constitute a variety of systems, including a film scanner and an electronic camera.

It is an object of the present invention to provide an image sensing device comprising:
  an array of photodetectors capable of generating electron/hole pairs from incident photons;
  a first charge coupled device having a plurality of cells, the first charge coupled device being operatively coupled to the photodetectors by first transfer means for placing charge accumulated within the photodetectors from generated electron/hole pairs within the first charge coupled device;
  a second charge coupled device having a plurality of cells being operatively coupled to the first charge coupled device by second transfer means for removing charge exceeding a threshold within the first charge coupled device and placing charge exceeding the threshold within the second charge coupled device;
  clocking means for cycling charge through the cells of the first and second charge coupled devices;
  amplification means for amplifying charge signals from the first and second charge coupled devices;
  output means for combining signals from the amplification means.
  The above and other objects of the present invention will become more apparent when taken in conjunction with the following description and drawings wherein like characters indicate like parts and which drawings form a part of the present invention.

ADVANTAGES OF THE PRESENT INVENTION

The tandem CCD imager provides a wider dynamic range than conventional CCD imagers. This is useful in many applications which need to image scenes with a wide range of signal strength, such as scanning photographic film, especially reversal and radiographic film, flash photography, photography under poorly controlled lighting, and machine vision.

BRIEF DESCRIPTION OF THE DRAWINGS

FIG. 3 is a diagram of a Tandem Well CCD imager as envisioned by the present invention.

FIG. 6 is a diagram of the method envisioned for combining a pair of digital output signals from a pair of CCD wells of the present invention.

FIG. 7 is a diagram of the method envisioned for combining a pair of analog output signals from a pair of CCD wells of the present invention.

DETAILED DESCRIPTION OF THE INVENTION

Figure 1:
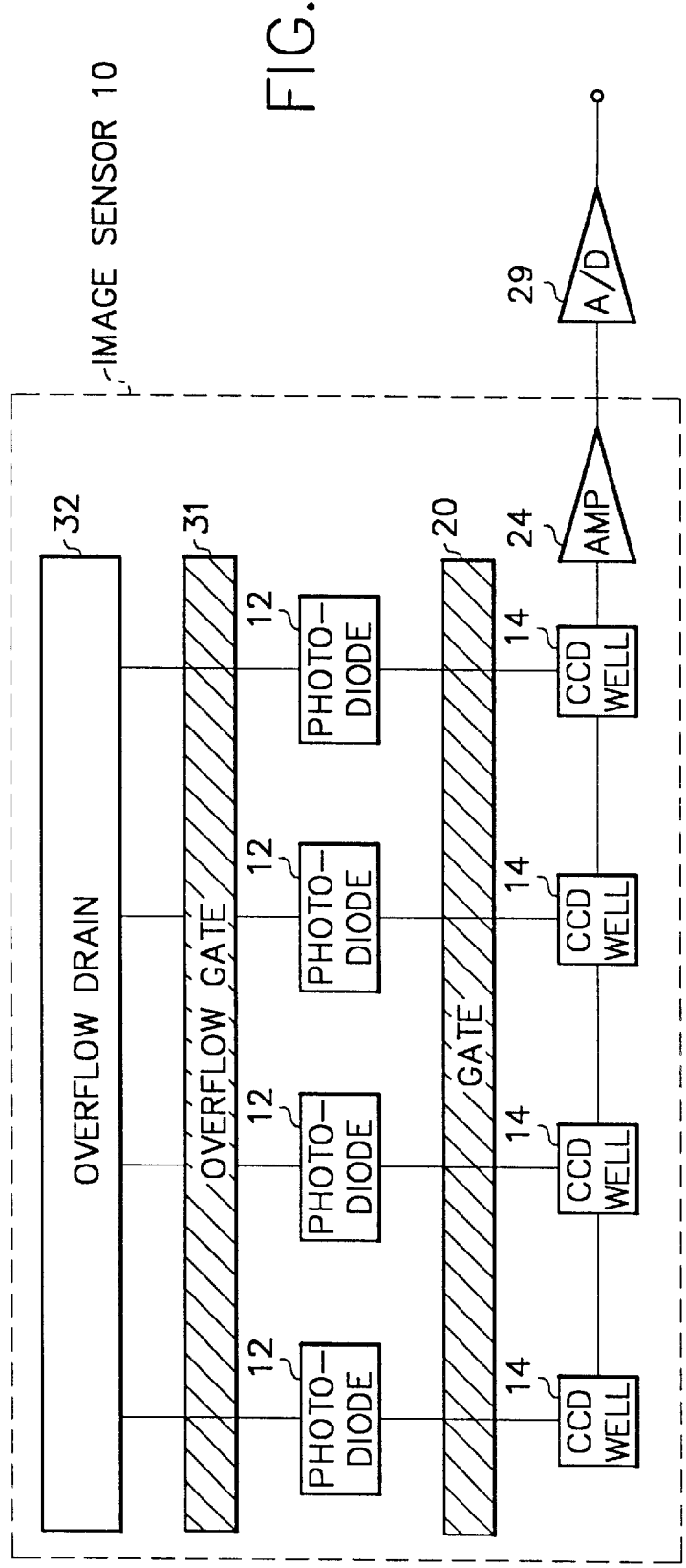
FIG. 1 is a diagram of a typical CCD imager.
Figure 2:
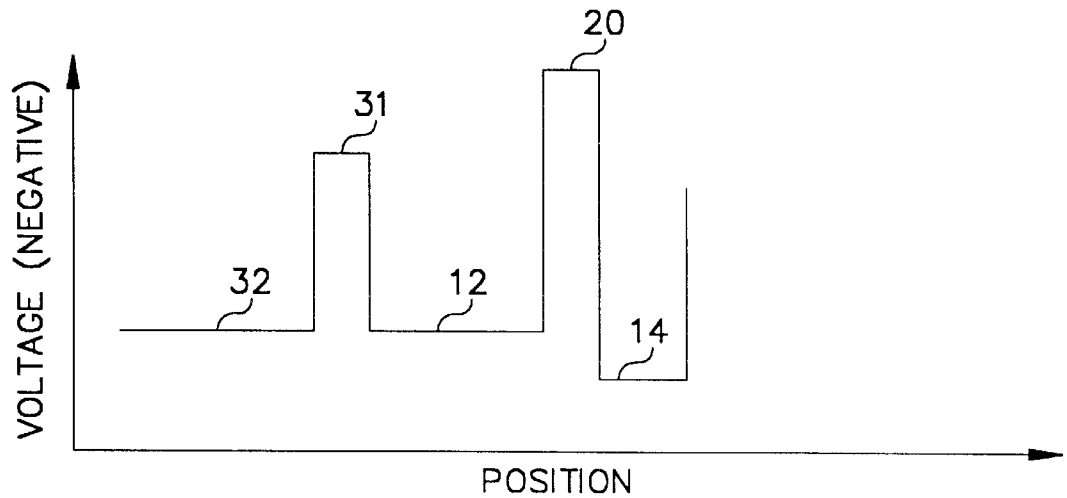
FIG. 2 is an energy diagram of one pixel of a typical prior art CCD imager as shown in FIG. 1.

The present invention envisions an improved design for an image sensor, generally referred to as 10 as shown in FIG. 3, wherein each pixel position consists of a photodiode 12 and two CCD wells. Large CCD well 16 has much larger electron capacity than the small CCD well 14, with the FIG. 3 showing the large CCD well 16 as being the farther away from photodiodes 12. While FIG. 3 shows a physically larger well for larger CCD well 16, this is pedagogical only. As is well known to those skilled in the relevant arts, the larger capacity well need not be physically larger. In image sensor 10, as in prior art CCD image sensors, the photons incident on the photodiode 12 during exposure generate electrons. After a predetermined amount of time used for accumulation of electrons, the gate 20 is lowered, and the electrons drain into the small CCD well 14. Unlike prior art CCD image sensors, if the incident light results in the generation of electrons creating a signal that is too large to be stored within the small CCD well 14, resulting in excess electrons beyond the capacity of the small CCD well 14, the excess electrons are not lost. Instead, they flow over the barrier 22, into the large CCD well 16.

After the electrons have drained into the CCD wells, the chains of CCD wells are clocked out to amplifiers 24, 25, in the usual CCD bucket brigade manner. The small CCD wells 14 forms one such CCD chain, clocked out to amplifier 24, and in turn to Analog to Digital converter 29. The set of charges from the large CCD wells 16 forms a second such CCD chain, and is clocked out to a second amplifier 25, and in turn to a second Analog to Digital converter 30. This results in two signals for each pixel, one signal from the small CCD chain, and a second signal from the large CCD chain. Various uses for these pairs of signals are described later.

The name "Tandem Well CCD Imager" is appropriate to the CCD image sensor 10, because each photodiode feeds two CCD's, one following behind the other. In an alternative embodiment, more than two sizes (capacities) of CCD wells are used. For each pixel, the photodiode feeds the smallest CCD well, which overflows into a larger CCD well, which overflows into an even larger CCD well, etc. Optionally, an overflow gate 31 and overflow drain 32 may be included in the design, in the same manner as for a single well CCD imager, to prevent blooming or to provide electronic exposure control. However, unlike the prior art CCD imager, an overflow drain 32 is often unnecessary, because large enough CCD wells can be provided to handle the largest expected light signal.

Figure 4:
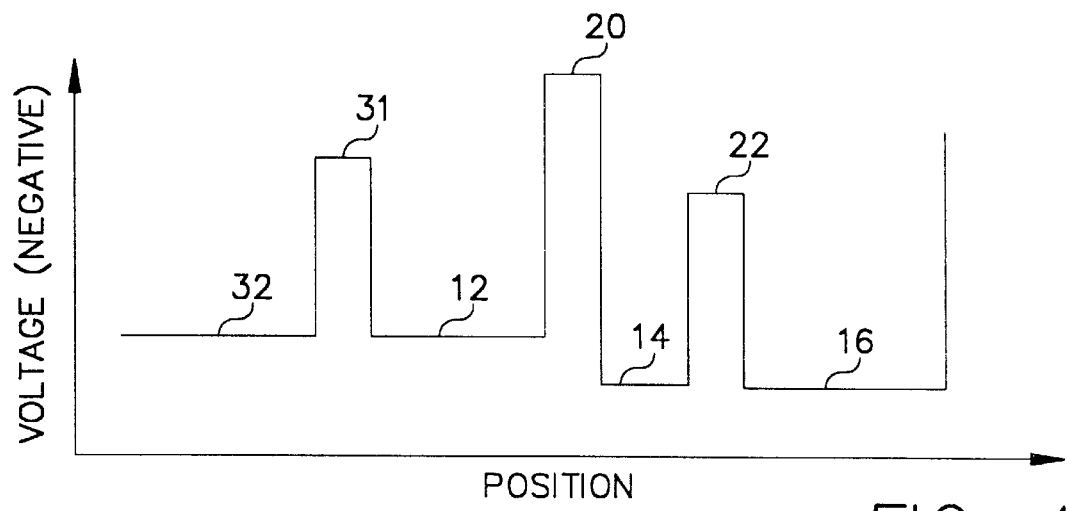
FIG. 4 is an energy diagram of one pixel of the improved CCD imager of FIG. 3.

Referring to FIG. 4, which is an energy diagram for the improved CCD imager of FIG. 3, incident photons generate electrons within the photodiode. Electrons flow initially into the small CCD well 14. If the incident light generates more electrons than the small CCD well 14 can accommodate, the excess electrons overflow the barrier 22 separating the small CCD well 14 from the large CCD well 16 and flow into the large well. The barrier 22 between the tandem CCD wells may be fixed, for example by permanent structures within the integrated circuit, or it may be variable, as a typical gate. As can be seen, overflow gate 31 controls the threshold at which charge will drain through overflow drain 32.

Figure 5:
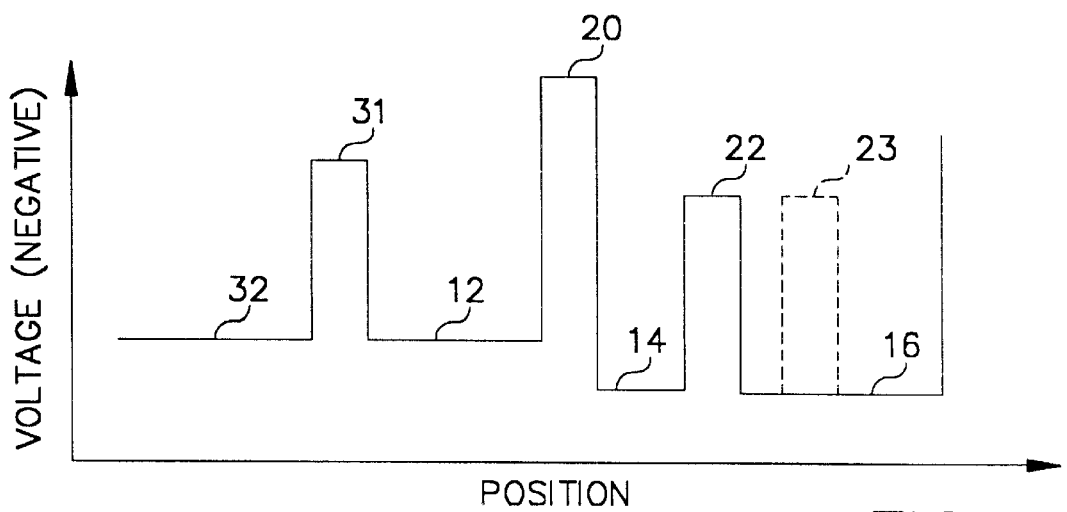
FIG. 5 is a diagram of variable size CCD wells created by multiple barriers.

FIG. 5 shows how even more flexibility can be achieved by providing multiple, controllable barriers between the tandem wells. The two barrier gates, 22,23, labeled Barrier 1 and Barrier 2 are shown. By raising Barrier 1 and lowering Barrier 2, a small capacity CCD well is formed to the left of Barrier 1. By lowering Barrier 1 and raising Barrier 2 (shown as a dashed line), a somewhat larger capacity CCD well is formed to the left of Barrier 2. This permits optimum sizing of the small CCD well to suit a particular application. An alternative way to change the well capacity is to simply raise the voltage at the bottom of the small CCD well, but this may have an undesirable effect on the noise for the cell, and thus it is not a preferred approach.

FIG. 6 is an illustration of a method for combining the outputs from the large and small wells, by converting the amplifier output from each of the Tandem CCD well bucket brigades into a digital signal and then comparing the signals. The illustration of FIG. 6 can be seen taken in conjunction with that of FIG. 3. There are a variety of ways to use the signal pairs generated by the Tandem Well CCD Imager for each pixel. In the embodiment shown in FIG. 6, the analog output signal from the small CCD wells 14 is converted into a digital signal by A/D converter 29, while the analog output signal from the large CCD well 16 is converted into a digital signal by A/D converter 30. Digital processing circuitry (which may be a computer, or specialized digital circuitry) compares the digital output of A/D converter 29 to a threshold. The threshold is typically set to correspond to slightly less than the maximum signal from the small CCD wells 14 (corresponding to a full well). If below the threshold, a multiplexer 58 selects this signal for output. If above the threshold, the signal from A/D 30 is amplified, and added to the threshold, and selected by multiplexer 58 for output.

In the preferred embodiment, when above the threshold the signal passed is A×S2+T, where S2 is the output signal strength for the large CCD well 16, and T is the threshold. The multiplicative factor A is chosen to match the signal gain above threshold to the signal gain below threshold, i.e. A is chosen so that the output signal from the circuitry is B×E both below and above the threshold T, where B is some constant, and E is the number of electrons generated in the photodiode. The signal gain A, is represented as 52 within FIG. 6. Multiplexer 58 will select the proper signal to create output 50 as a result of the determination made by comparator 54. This signal processing may be refined in various ways to compensate for device imperfections, such as different threshold and gains for each pixel, offsets resulting from electron losses (such as at electron traps in the integrated circuit) between the tandem wells, blurred thresholds caused by thermal effects, non-linearity in the amplifiers and A/D's.

A similar approach can be used to combine signals in the analog domain, before the analog to digital conversion, to avoid the need for two A/D converters. This type of embodiment is shown in FIG. 7. Here, when switching to using the large CCD well 16 signal, the small CCD well 14 signal (rather than the threshold) is added to the large CCD signal by analog adding device 67. This more accurately reflects the original number of electrons generated in the photodiode than would adding the threshold to the large CCD signal. The threshold is set so that the comparator 66 decides either that the small CCD well signal is near full well, or else substantially below full well. If the comparator 66 decides that the small CCD well 14 signal is substantially below full well, then the circuitry routes the small CCD well 14 signal through multiplexer 64 to the A/D 63, where the signal is digitized, and then the digitized signal is passed to the output 60. (In this case, the large CCD well signal is ignored, and should be near 0.)

Alternatively, if the comparator 66 decides that the small CCD well signal 39 is near full well, then the small CCD well signal 39 passes through a first amplifier 68, whose gain is set so that at the first adder 67, the signals at both inputs have identical values per electron from the photodiode (i.e. the gain from the photodiode to the adder is the same for the path through the small CCD well as for the path through the large CCD well). Then the signal from the small CCD well 14 is combined with the large CCD well 16 signal, in the first adder 67. A negative offset signal 45 is added at the next adder 65. This offset 45 reduces the minimum signal to near zero, to use the full range of the A/D 63. The signal from the first amplifier 68 is nearly constant (whenever the output of comparator 66 engages this portion of the circuit), approximately equal to threshold times the gain of the first amp 68, because the small CCD well is near full. Thus, without the offset, the output of the first adder 67 would never go near zero. The output of the offset adder 65 passes through the multiplexer 64 to the A/D 63, where it is digitized. The digital signal now passes through an offset adder 62 which reverses the effect of the previous offset adder 65. The output of offset adder 65 passes through amplifier 61, whose gain is set so that the signal to the second multiplexer 46 is now on the same numerical scale as the other input signal to the second multiplexer 46. The signal passes through the second multiplexer 46 to the final output 60.

Referring to FIG. 7, a circuit is illustrated used for combining the analog output signals from the Tandem CCD wells after being output from the amplifiers 24, 25 and prior the conversion to digital signals. The effect of the circuit of FIG. 7 is to use the small CCD well signal alone when this signal is substantially below saturation, and otherwise to combine the small and large CCD well signals. This yields low noise for low signals (from the small CCD well), while avoiding saturation of larger signals (from the combined small and large CCD wells). The signals along these two different paths are balanced at the A/D input, to make optimum use of the dynamic range of the single A/D for both signal paths.

The tandem well design may be used for both linear and area CCD image sensors. It is not necessary that the second, third, etc. wells be successively larger, but in most applications this is the most appropriate design.

Figure 8:
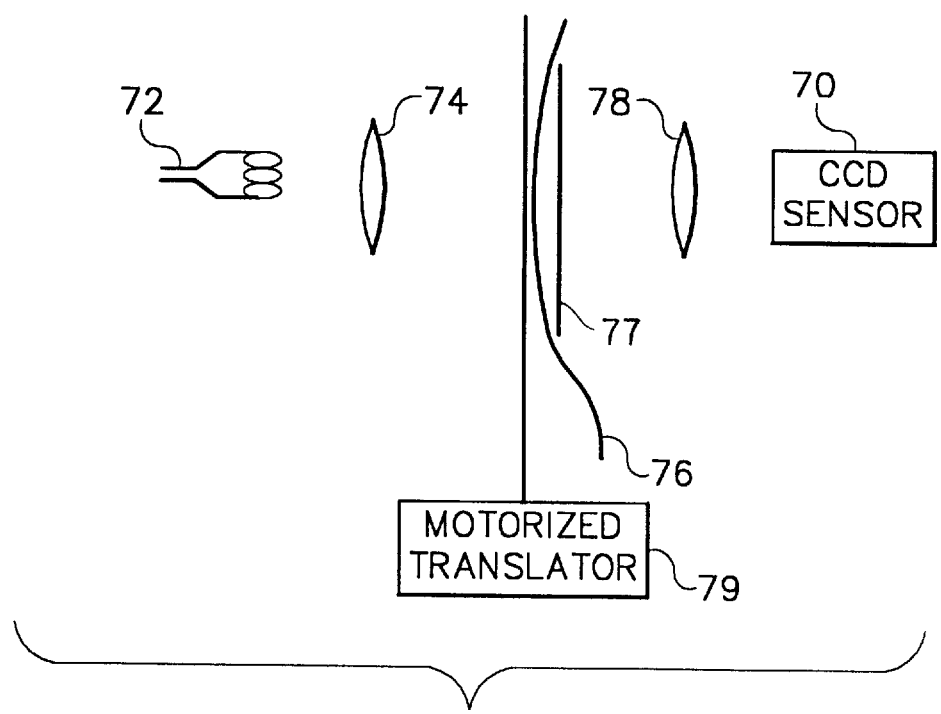
FIG. 8 is a system diagram of a film scanner employing a sensor of the present invention.

FIG. 8 illustrates a film input scanner using a linear tandem CCD image sensor 70. Lamp 72 and lens 74 illuminate the film 76. A narrow strip of film is imaged by a second lens 78 onto the linear CCD sensor 70. A motorized translator 79 moves the film 76 to scan successive strips. This is a conventional film scanner design, except for he tandem sensor, which increases the dynamic range. A lamp and optics illuminate the film. The light is transmitted and modulated by the film image, and focused by the second lens 78 onto the linear, tandem CCD image sensor 70. A plurality of pixels on the linear sensor responds to a narrow, stripe portion of the film image. A motorized translator 79 moves the film 76, and the CCD sensor 70 responds to a series of stripes across the film image frame, thereby building up a plurality of stripes, each stripe consisting of a plurality of pixels, which represents the 2-dimensional image on the film.

Figure 9:
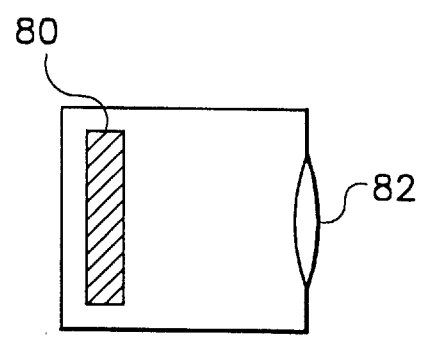
FIG. 9 is a diagram of an electronic camera made using the sensor of the present invention.

FIG. 9 shows another use for a tandem CCD sensor as part of an electronic camera design. The sensor shown is an area CCD. Electronic shuttering is accomplished by emptying the CCD wells during exposure, while charge accumulates in the photodiodes. At the completion of the exposure time, the gate is lowered, and the charge flows from the photodiodes to the tandem CCD wells, and then is transferred out to the amplifiers and A/D's. Mechanical shuttering may be used instead, as in conventional film cameras.

Additionally, the present invention can be employed into active pixel sensor architectures wherein bucket brigade charge coupled devices are not used to transfer charge. Charge can be transferred via a floating diffusion (not shown) to CMOS circuitry (not shown), for example, that addresses the pixels as desired. These pixels may be independently addressable. An active pixel system upon which the present invention can be employed is discussed in *CMOS Active Pixel Image Sensor* in the IEEE Transactions on Electron Devices, Vol. 41, No. 3, March 1994. This system would have to be modified to provide for the additional wells and outputting the charge contained, therein, in a manner that can be used by the control circuitry. These variations are obvious modifications to those skilled in the art.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

PARTS LIST 10 image sensor
12 photodiode
14 small CCD well
14' small CCD well
16 large CCD well
16' large CCD well
20 gate
22 barrier 1
23 barrier 2
24 amplifier for small CCD well signal
25 amplifier for large CCD well signal
29 A/D for small CCD well signal
30 A/D for large CCD well signal
31 overflow gate
32 overflow drain
39 small CCD well signal output
40 large CCD well signal output
42 offset signal
45 offset signal
46 multiplexer
50 output
52 gain amplifier
53 threshold input
54 comparator
56 adder
58 multiplexer
60 output
61 second amplifier
62 offset adder
63 A/D
64 multiplexer
65 offset adder
66 comparator
67 adder
68 first amplifier
69 threshold input
70 CCD sensor
72 lamp
74 condenser lens
76 film
77 clamp
78 objective lens
79 motorized translator
80 CCD sensor
82 lens

I claim:

1. An image sensing device comprising:
   an array of photodetectors capable of generating electron/hole pairs from incident photons;
   a first charge coupled device having a plurality of cells, the first charge coupled device being operatively coupled to the photodetectors by first transfer means for placing charge accumulated within the photodetectors from generated electron/hole pairs within the first charge coupled device;
   a second charge coupled device having a plurality of cells being operatively coupled to the first charge coupled device by second transfer means for removing charge exceeding a threshold within the first charge coupled device and placing charge exceeding the threshold within the second charge coupled device;
   clocking means for cycling charge through the cells of the first and second charge coupled devices;
   first output means for receiving transferred charge from the first charge coupled device;
   second output means for receiving transferred charge from the second charge coupled device; and
   combinatorial means for creating a combined output based on the first output means and the second output means.

2. The invention of claim 1 wherein one of the charge coupled devices is larger than the other.

3. The invention of claim 1 further comprising means for altering the charge storage capacity of the charge coupled devices.

4. The invention of claim 1 further comprising at least a third charge coupled device being operatively coupled to one of the previous charge coupled device and having means for transferring charge exceeding a threshold from the previous charge coupled device, the third charge coupled device also being coupled to third output means for receiving transferred charge from the third charge coupled device, the third output means being operatively coupled to combinatorial means for generating a predetermined output based on the first, second and third output means.

5. The invention of claim 1 wherein the output means further comprises means for digitizing charges contained within the charge coupled devices and combining the digitized signals into at least one signal representative of charge contained within the charge coupled devices.

6. The invention of claim 1 wherein the output means further comprises analog means for combining analog signals generated from output amplifiers into at least one signal representative of charge contained within the charge coupled devices.

7. The invention of claim 1 wherein the image sensing device is a linear image sensor.

8. The invention of claim 1 wherein the image sensing device is an area image sensor.

9. The image sensing device of claim 1 further comprising overflow drain means for controlling excess charge from spilling to other pixels.

10. The image sensing device of claim 1 wherein the image sensing device is employed in a digital camera.

11. The image sensing device of claim 1 wherein the image sensing device is employed in a film scanner.

12. A method of creating an image sensing device comprising the steps of:

providing as a sensor an array of photodetectors capable of generating electron/hole pairs from incident photons coupled to an adjacent first charge coupled device having a plurality of cells operatively coupled to transfer means for placing charge from the photodetectors into the first charge coupled device;

additionally providing a second charge coupled device with second transfer means such that charge exceeding a threshold within the first charge coupled device will flow into the second charge coupled device;

organizing the first charge coupled device such that cells with the first charge coupled device are serially shifted to adjacent cells within the first charge coupled device in bucket brigade fashion;

organizing the second charge coupled device such that cells with the second charge coupled device are serially shifted to adjacent cells within the second charge coupled device in bucket brigade fashion;

providing clocking means for cycling charge through cells of the first and second charge coupled devices to output means; and providing output means for combining charges from the first charge coupled device and the second charge coupled device such that an output is generated for each of the photodetectors that is a combination of at least one cell in the first charge coupled device and at least one cell in the second charge coupled device.

13. The method of claim 12 wherein the step of additionally providing the second charge coupled device further comprises providing second cells within the second charge coupled device that have larger charge storage capacity than the cells within the first charge coupled device.

14. The method of claim 12 wherein the step of additionally providing further comprises providing means for altering the charge storage capacity of wells within at least one of the charge coupled devices.

15. The method of claim 12 further comprising at least a third charge coupled device operatively coupled to one of the previous charge coupled device and having means for transferring charge exceeding a threshold from the previous charge coupled device, the third charge coupled device also being coupled to output means.

16. The method of claim 12 wherein the creating step further comprises creating output means having means for digitizing charges contained within the charge coupled devices and combining the digitized signals into at least one signal.

17. The method of claim 12 wherein the creating step further comprises creating analog output means for combining analog signals generated from output amplifiers into at least one signal.

18. The method of claim 12 wherein the providing step further comprises as the sensor a linear image sensor.

19. The method of claim 12 wherein the providing step further comprises providing the sensor that is an area image sensor.

20. The method of claim 12 wherein the providing step further comprises providing an overflow drain means.

21. In an active pixel image sensor having at least one photodetector capable of generating electron/hole pairs in response to incident light, original storage well means for accumulating charge from the photodetector and means for removing the charge from the storage well means to processing circuitry, the improvement comprising additional storage wells such that the original storage well means and the additional storage wells are organized to provide multiple stages of cascading storage wells, the additional storage wells storing charge from adjacent storage wells within the original storage well means closer to the photodetector that exceeds a threshold limit existing on cells within the original storage well means, with means for removing charge from the original storage well means and the adjacent storage wells being coupled to each of the original storage well means and adjacent storage wells such that charge can be removed independently from each the original storage well means and the adjacent storage wells independently each other, and output means for combining charges from the original storage well means and the additional storage wells into an output for the photodetector.

* * * * *